Dec. 27, 1960 H. RUDOLPH 2,966,548
MULTIPLEX PULSE MODULATION SYSTEM FOR TELEGRAPHY
Filed Nov. 25, 1953 6 Sheets-Sheet 1

Inventor:
Hans Rudolph
By
Att'y

Dec. 27, 1960 H. RUDOLPH 2,966,548

MULTIPLEX PULSE MODULATION SYSTEM FOR TELEGRAPHY

Filed Nov. 25, 1953 6 Sheets-Sheet 2

Inventor:
Hans Rudolph
By
Att'y

Inventor:
Hans Rudolph
By [signature]
Att'y

Dec. 27, 1960 H. RUDOLPH 2,966,548

MULTIPLEX PULSE MODULATION SYSTEM FOR TELEGRAPHY

Filed Nov. 25, 1953 6 Sheets-Sheet 4

Inventor:
Hans Rudolph
By [signature]
Att'y

Inventor:
Hans Rudolph
By
Att'y

Inventor:
Hans Rudolph.
By. [signature] Atty.

2,966,548

MULTIPLEX PULSE MODULATION SYSTEM FOR TELEGRAPHY

Hans Rudolph, Munich-Solln, Germany, assignor to Siemens & Halske Aktiengesellschaft, Munich, Germany, a corporation of Germany Filed Nov. 25, 1953, Ser. No. 394,467

Claims priority, application Germany Dec. 20, 1952

2 Claims. (Cl. 178—52)

This invention is concerned with a multiplex pulse modulation system for telegraphy.

The multiplex system permits a plurality of telegraphic messages to be transmitted over a single line or channel. Known mechanical multiplex distributors have the disadvantage that the speed of scanning and thus the number of messages that can be transmitted, are limited due to the inertia of the moving members. Improved results are obtained by the use of alternating current telegraphy, which is frequently resorted to at the present time. However, this system has the disadvantage that the frequency band available for transmission cannot be fully utilized because the frequency gaps required for separating the individual channels are lost to message transmission.

The pulse modulation system, known in telephony, can also be employed for transmitting telegraphic messages, but it requires a very broad frequency band and necessitates relatively complex equipment.

It is an object of the present invention to provide a multiplex telegraph system which employs pulse modulation and which permits the transmission of a maximum of messages with relatively simple equipment.

In accordance with the present invention, the scanning voltages of the multiplex distributor are such that their duration substantially equals the period of the channel pulse, divided by the total number of channels.

In known multiplex pulse modulation systems the duration or length of a pulse is relatively small as compared to the interval between successive pulses. In contrast thereto, according to the present invention the scanning pulses succeed each other with practically negligible intervals therebetween, and in particular, the duration of the pulse is no longer small as compared to the pulse spacing. It is, however, possible to make the pulse length substantially equal to the pulse spacing without thereby departing from the scope of this invention.

In accordance with a further feature of this invention, the length of the channel pulse is preferably made equal to the length of the elements of the telegraphic signals to be transmitted. In teleprinter operation, which will be made the basis of the following discussion, the length of the signal element is 20 milliseconds (ms.). Accordingly, the channel pulse should be made 50 cycles, since at this frequency each signal channel will be scanned every 20 milliseconds. Hence, each element of each signal channel will be scanned once. In order to insure perfect and unambiguous scanning of the signal elements, precautions must be taken to prevent a scanning period from coinciding with a current-phase change. In accordance with a still further feature of the present invention, this is accomplished by employing a phase coordinator which allots the element starts of the telegraphic signals to be transmitted, to a time-screen system which is governed by the moments of starting of the scanning voltages.

Theoretically, it would be possible to design the scanning distributor so as to cover a large number of messages being transmitted simultaneously. However, with increasing number of channels, the requirement of precision likewise increases, particularly with regard to the scanning means, and this entails a considerable increase in equipment requirements per channel. On the other hand, it should be borne in mind that in order to stay within admissible limits of distortion, the frequency band required for transmission will be the broader the greater the selected stepping speed of the telegraphic signals.

The following discussion will be based on the assumption that the telegraphic system of the present invention is to be operable also over telephone channels of the conventional band width. This means that a frequency band of 3100 cycles in width is available for transmission. Assuming a stepping speed of 1950 Bd. to be admissible, it will thus be possible to superpose 39 teletype messages of 50 Bd. each in a single signal channel.

As already mentioned, the greater the number of distributor steps, the shorter will be the individual scanning periods and the higher will be the demands for synchronism between transmitting and receiving distributors and for accurate maintenance of the moments of scanning. A distributor having a smaller number of steps not only requires less scanning accuracy but also entails certain other advantages. Therefore, it is frequently more advantageous to dispense with maximum utilization of the available frequency band and to reduce the number of steps of the distributor or distributor system.

In accordance with a further feature of this invention, it is proposed to operate a plurality of distributor systems of moderate number of stages, preferably a plurality of twelve-stage distributor systems, on one subdivided signal channel. Assuming a stepping speed of 50 Bd. for the individual message, such a twelve-stage distributor would have a stepping speed of 600 Bd. Thus, the maximum scanning period per channel would be about 1.66 ms. Advantageously, three such twelve-stage distributor systems are operated with different carrier frequencies over one subdivided signal channel. Suitable carrier frequencies are, for example, 850, 1850 and 2850 cycles. Each distributor system wil lthen have available a band width of about 850 to 900 cycles, taking into account a frequency band gap between the distributor systems. All frequencies up to 1.4 or 1.5 times the step frequency will be transmitted, and this may be regarded as adequate, considering the distortion-eliminating effect of the scanning means on the receiving side. The use of three twelve-stage distributor systems per signal channel has the further advantage that only twelve scanning voltages need be produced and can be jointly used by all three distributor stages, thus further reducing the equipment requirements.

To insure maximum reliability of transmission and to be as independent as possible of level variations in the transmission line, it is preferable to employ a modulation system with double current characteristics. Two systems are possible: frequency modulation and phase modulation. The shortcoming inherent in phase modulation, namely, uncertainty as to polarity on the receiving side, can easily be avoided in the present case; to this end, the synchronization signals, which are transmitted for synchronizing the distributors on the transmitting and receiving sides, are in addition employed for phase control and for phase correction in the event of polarity errors. This renders the phase system with 180° phase displacement particularly suitable as the modulation system; above all it insures the exact transmission of the elements necessary for synchronism. The limitation of the frequency band merely has the effect of making the amplitude rise slower, whereas the position of the phase displacement remains unaffected.

The system according to the present invention, and a transmitting apparatus embodying this system, will now be described in greater detail with reference to the accompanying drawings, in which:

Figs. 1*a* to 1*e* diagrammatically illustrate the course of the scanning operation as a function of time, and the effect of the phase allotter;

Figs. 2*a* to 2*c* are diagrams illustrating a further advantagous design of the phase-screen system;

Figs. 3*a* to 3*c* are graphs illustrating a preferred method of producing the scanning voltages required for the system according to this invention;

Figs. 4, 5 and 6 diagrammatically represent various forms of modulated transmission currents;

The embodiments of the invention hereinafter discussed are based on a twelve-stage system in which the telegraphic messages are to be transmitted by teleprinters.

Figure 1:
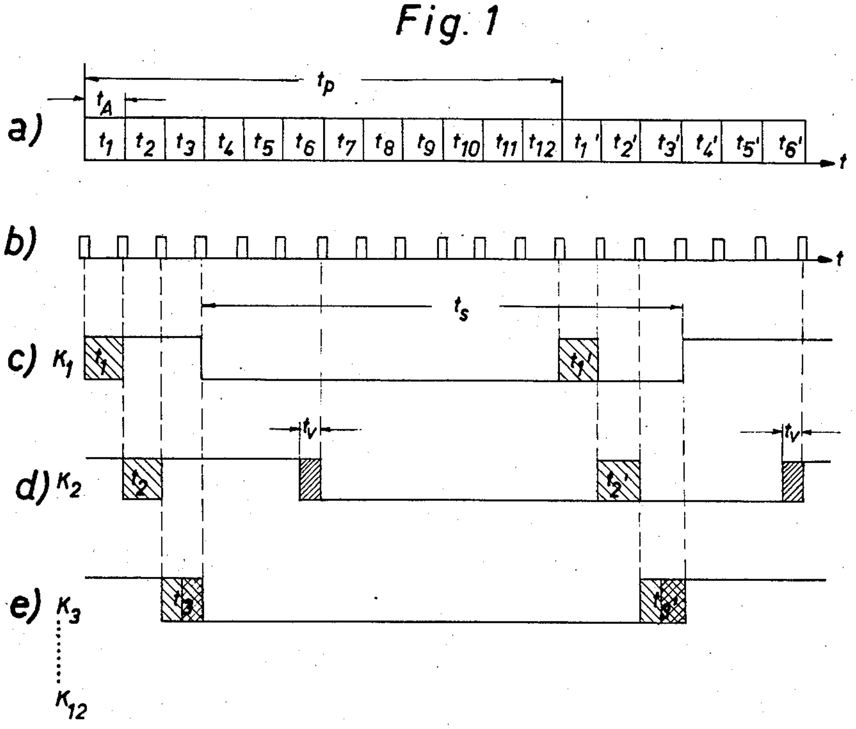

Referring first to Figs. 1*a* to 1*e*, the scanning operation and the effect of the phase coordinator are illustrated therein as a function of time. In Fig. 1*a*, there are plotted over the time axis $t$, the scanning times $t_A$ for each of the twelve signal channels, the scanning times being designated $t_1$ to $t_{12}$ to correspond to channels $K_1$ to $K_{12}$. The cycle-duration of the channel pulse is designated $t_p$. In accordance with the present invention, the scanning time $t_A$ is to be approximately equal to the cycle-duration of the channel pulse divided by the number of channels; it follows that the scanning times for all channels are alike and follow upon each other practically without any particular gaps or intervals therebetween. In the example shown in Fig. 1*a*, the scanning time is exactly equal to the cycle-duration of the channel pulse divided by the number of channels. As is apparent from this figure, the individual channels are scanned successively, with the relative position of each channel within a complete scanning cycle remaining constant.

Thus, the scanning takes place independently of the phase position of the signal elements of the individual channels. In order to prevent a current element change from occurring during the scanning of a channel, it is necessary to time the current element changes of the individual channels relative to the scanning screen pattern, by means of a phase coordinator in such a manner that the current element changes can take place only at those moments at which the channel under consideration is not being scanned. Corresponding phase-screen patterns are illustrated in Fig. 1*b* and in Figs. 2*b* and 2*c* and will be presently more fully explained.

The course of the scanning operation will be explained with reference to arbitrarily selected elements of signal channels $K_1$ to $K_3$, as illustrated for 1½ revolutions of the scanning distributor in Figs. 1*c* to 1*e*. Here again, the channel pulse $t_p$ has been made equal to the length of the signal element $t_s$. In Fig. 1*c*, the signal channel $K_1$ shows the space current condition which is scanned during the scanning time $t_1$. The next-following mark signal is scanned during the time $t_1'$. The space current condition, scanned during the time $t_1'$ thus persists up to the beginning of the scanning time $t_1'$. Not until the time $t_1'$ commences, will the mark signal current condition be determined. As far as the transmission of the message is concerned, this merely means that the signal elements are all uniformly spaced in time, such spacing being at most equal to the length of the channel pulse, minus the length of the channel pulse divided by the number of channels.

Fig. 1*d* illustrates a similar example for channel $K_2$. During the scanning time $t_2$, again, the arbitrarily assumed space current condition of channel $K_2$ is scanned. In this instance, the change from space to mark signal element current condition does not fall within the screen pattern predetermined by the phase coordinator and is, therefore, shifted by the amount $t_v$ by the phase coordinator. This shift is effected both at the beginning and at the end of the current element. Scanning of the mark signal current element takes place during the scanning time $t_2'$, again signifying a time shift in the signal sequence of this channel.

In the examples of Figs. 1*c* and 1*d*, proper scanning of the current elements would take place also in the absence of a phase coordinator, as the current condition changes do not coincide with the scanning times of either channel. On the other hand, with the conditions illustrated in Fig. 1*e* for channel $K_3$, for example, the use of a phase coordinator becomes indispensable. As is apparent from Fig. 1*e*, the change of current condition in this instance takes place during a scanning interval. If no phase coordinator were used, the scanning during time $t_3$ would first cover space and then mark signal current condition; but when a phase coordinator is employed, only one and the same current condition will be scanned during the entire scanning time. The phase coordinator shifts the change in current condition in such a manner that only space current will be scanned during time $t_3$, and only mark signal current will be scanned during $t_3'$.

Scanning of the remaining channels takes place in the same manner as above described with reference to channels $K_1$ to $K_3$.

Figure 2:
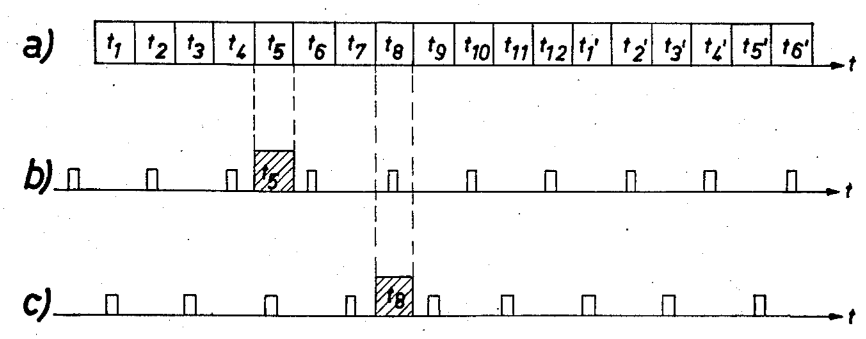

Another very advantageous embodiment of phase-screening is illustrated in Figs. 2*a* to 2*c*. The scanning times, designated $t_1$ to $t_{12}$, of the signal channels, are plotted in Fig. 2*a* over the time axis $t$. The phase-screening in this instance consists of two parts, one (Fig. 2*b*) allotted to the odd-numbred channels and the other (Fig. 2*c*) allotted to the even-numbered channels. As is apparent from Fig. 2*b* with reference to the scanning of channel $K_5$, this phase-screening leaves gaps of one-half the scanning time for one signal channel on either side of the scanning period, that is between the beginning and end, respectively, of the scanning period and the screening point nearest thereto. This permits the requirements as to accuracy to be lowered, both as to the relative position in time of the scanning voltages and the screening points and as to the length of the scanning time itself.

Fig. 2*c* illustrates the effect of the phase-screening for the even-numbered signal channels, using channel 8 as an example.

If the phase distributors are synchronized, for example, with an alternating voltage of a frequency of 300 cycles, as is the case in the numerical example hereinafter given, the two screening systems can be obtained in a simple manner, by synchronizing phase coordinators Nos. 1, 3, 5, 7, 9, and 11 with half waves of one polarity of the synchronizing voltage, for example the positive half-waves, and synchronizing the coordinators Nos. 2, 4, 6, 8, 10 and 12 with the other, oppositely poled, for example, negative, half-waves.

If the cycle length of the channel pulse is made equal to the length or duration of the current signal element, a twelve-stage distributor will require twelve scanning voltages, to be effective in direct sequence for one-twelfth of the the element duration each, and to be successively applied to the twelve distributor stages.

The scanning voltages for the individual channels may be produced in any desired manner. According to a further feature of the present invention, these voltages may be obtained in a simple manner by superimposing two sine-shaped alternating voltages of different frequencies.

Figure 3:
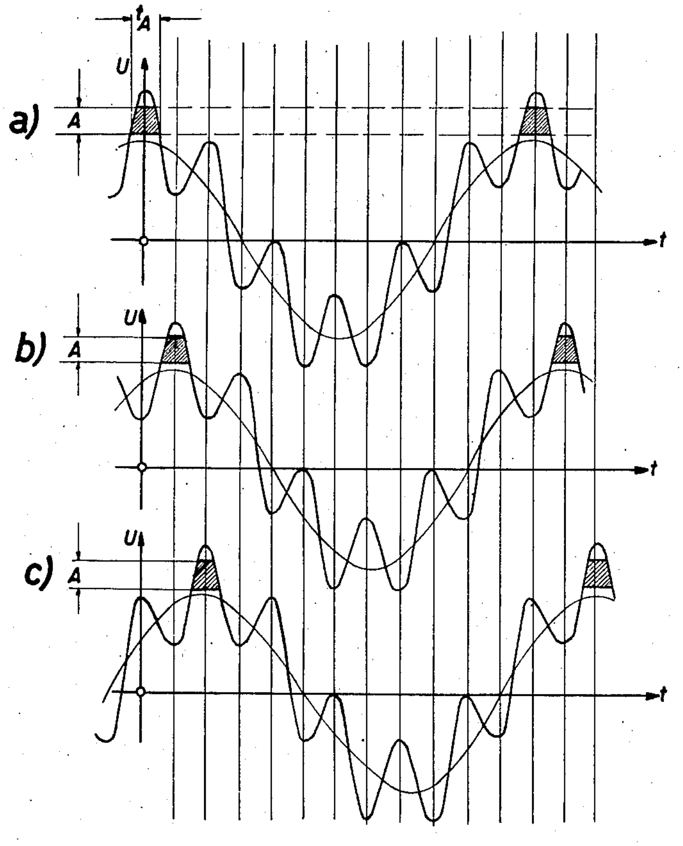

The manner of producing the scanning voltages is illustrated in greater detail in Figs. 3*a* to 3*c*. Each signal channel is to be scanned once per signal element, that is at intervals of 20 ms., or at a frequency of 50 cycles. By making the frequency of one of the alternating voltages equal to this scanning frequency of 50 cycles and superimposing thereover an alternating frequency of 300 cycles, in suitable phase position, there will be obtained the resultant alternating voltage illustrated in Fig. 3*a*. The amplitude of this resultant voltage reaches a maximum once every 20 milliseconds, coinciding with the positive peaks of the 50-cycle voltage. By suitably selecting the effective control range A of the scanning circuit, it is possible to block out the scanning voltage from the peaks of the resultant voltage curve during the scanning time $t_A$. The amplitude of the 300-cycle alternating voltage is advantageously made about one-half that of the 50-cycle voltage.

To obtain the scanning voltages for the remaining signal channels, it is merely necessary to shift the phase of the 50-cycle voltage by 30° from step to step and to change the polarity of the 300-cycle voltage as will be evident from Figs. 3*b* and 3*c*. Figs. 3*a* to 3*c* illustrate the production of the scanning voltages for three signal channels. The voltages for the remaining channels are obtained in an analogous manner.

If a different pulse sequence frequency, that is, a different channel pulse or a different number of channels, has been selected, the required scanning voltages may again be obtained in the manner just described, by superimposing two suitable alternating currents of different frequencies that are readily determined from the pulse sequence frequency and the channel pulse, respectively.

The 30° phase displacement of the 50-cycle voltage can be obtained in the known manner, either by employing a chain circuit or by the combination of two sine oscillations of suitable amplitude with a phase angle of 90° therebetween. Another expedient, serving the same purpose, is to combine two sine oscillations with a phase displacement of 60°. Inasmuch as the 300-cycle and 50-cycle frequencies must be synchronous, it is preferable to derive the 50 cycles by frequency division from a frequency-stabilized 300-cycle generator; this same generator may also be employed to supply the voltage for synchronizing the phase allotters or distributors.

On the receiving side, it is essential that the rhythm pulses, transmitted for synchronizing the transmitter and receiver distributors, be clearly discernible from other signal elements employed in message transmission. To provide a reliable distinction, it would be possible to use different types of modulation; thus, the first of the twelve distributor steps could always be transmitted as an interval step, and the second always as a space step with the reference phase required for phase control, while the transition between first and second distributor steps would supply the rhythm pulse. However, this would necessitate the provision of a special single-tone receiving circuit with its notoriously great expenditure in equipment for level variation control and its inherent drawbacks as to likelihood of disturbances.

Another possibility would be to produce the rhythm pulse by frequency switching of the first distributor step. This, to, entails considerable disadvantages, because it would necessitate the availability of special devices for frequency scanning on both the transmitting and receiving sides. In many cases it is preferable to adhere to a uniform mode of modulation. The known expedient of distinguishing rhythm pulses from signal element pulses by different pulse lengths, is not applicable here because the present system does not involve a true pulse method, and because the individual pulses follow upon each other practically without any appreciable interval.

Phase modulation affords a convenient distinguishing feature in the form of a change in the degree of modulation; and particularly, it permits the rhythm pulse to be transmitted with the same reliability as the signal element pulses are transmitted by the remaining distributor steps. For example, the first distributor step may be given phase position −90°, and the second step may have phase position +90°. The phase displacement of 180° between them is utilized on the receiving side for obtaining the rhythm pulse and at the same time for phase supervision of the demodulation carrier. The further distributor steps alternate between the phase positions 0° and 180° in accordance with the space and mark signal current elements of the individual messages, with the space current elements preferably having the reference phase 0° of the carrier current allotted thereto.

Frequency modulation likewise affords a convenient distinguishing feature, for example by selecting for the scanning of the rhythm pulse a frequency stroke distinguishable from that for the scanning of the message signal channels.

In the method just mentioned, one or two of the distributor steps that would otherwise be available for message transmission, are lost to actual message transmission as they are needed for transmitting the rhythm pulse. A further manner of operation shall now be described which does not require a distributor step for transmitting the synchronizing pulses. This operation provides for superimposing a synchronization frequency by amplitude modulation directly over the frequency-modulated or amplitude-modulated signal current. The cycle duration of the synchronization frequency equals one revolution of the distributor.

Figures 4, 5, 6:
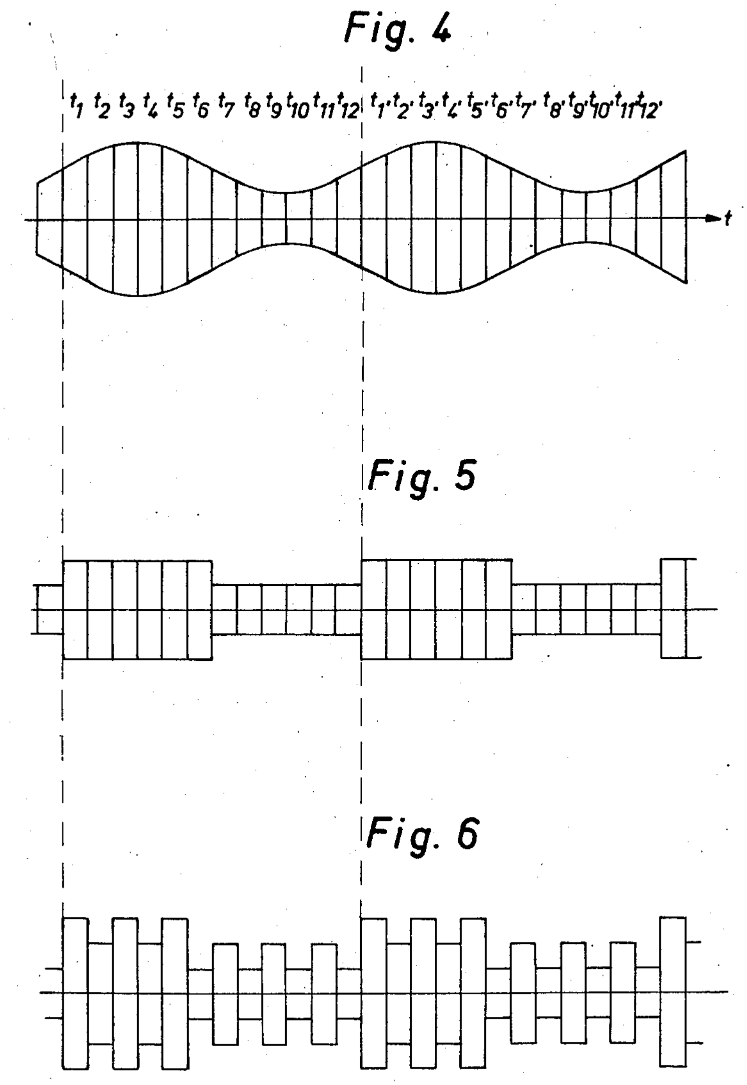

For a twelve-stage distributor, and assuming sine-shaped modulation, the enveloping curve for the signal current will be as shown in Fig. 4. This figure illustrates, over the time axis $t$, the amplitudes of the amplitude-modulated signal current for twelve distributor steps $t_1$ to $t_{12}$ and again $t_1'$ to $t_{12}'$.

Alternatively, and as shown in Fig. 5, it is possible to modulate into a rectangular curve by making the transmission voltage for distributor steps 1 to 6 higher than for steps 7 to 12.

On the receiving side, the scanning frequency would then be produced from the modulation frequency (50 cycles in the contemplated example) by frequency multiplication. The equipment on the receiving side can be made still simpler by superimposing the synhcronization frequency (50 cycles) and the scanning frequency (300 cycles) and simultaneously modulating the transmitted signal current with both frequencies. In that case, both frequencies will be obtained directly from the signal current on the receiving side by rectification, and need only be separated from each other by a filter. On the transmitting side, modulation may be effected by suitably staggering the transmission voltages of the individual distributor steps. An embodiment of this character is illustrated in Fig. 6.

When operating a plurality of distributor systems over a common transmission path with the use of different carrier frequencies, it is advantageous to provide a phase displacement between the synchronization and/or scanning frequencies, superimposed over the individual signal currents by amplitude modulation, and to select this phase displacement so as to avoid addition of the maxima (superposition of the peaks).

When employing transmission paths having sufficiently constant operation time characteristics, it is sufficient to transmit the synchronization and scanning frequencies once for all simultaneously operated distributor systems.

Figure 7:
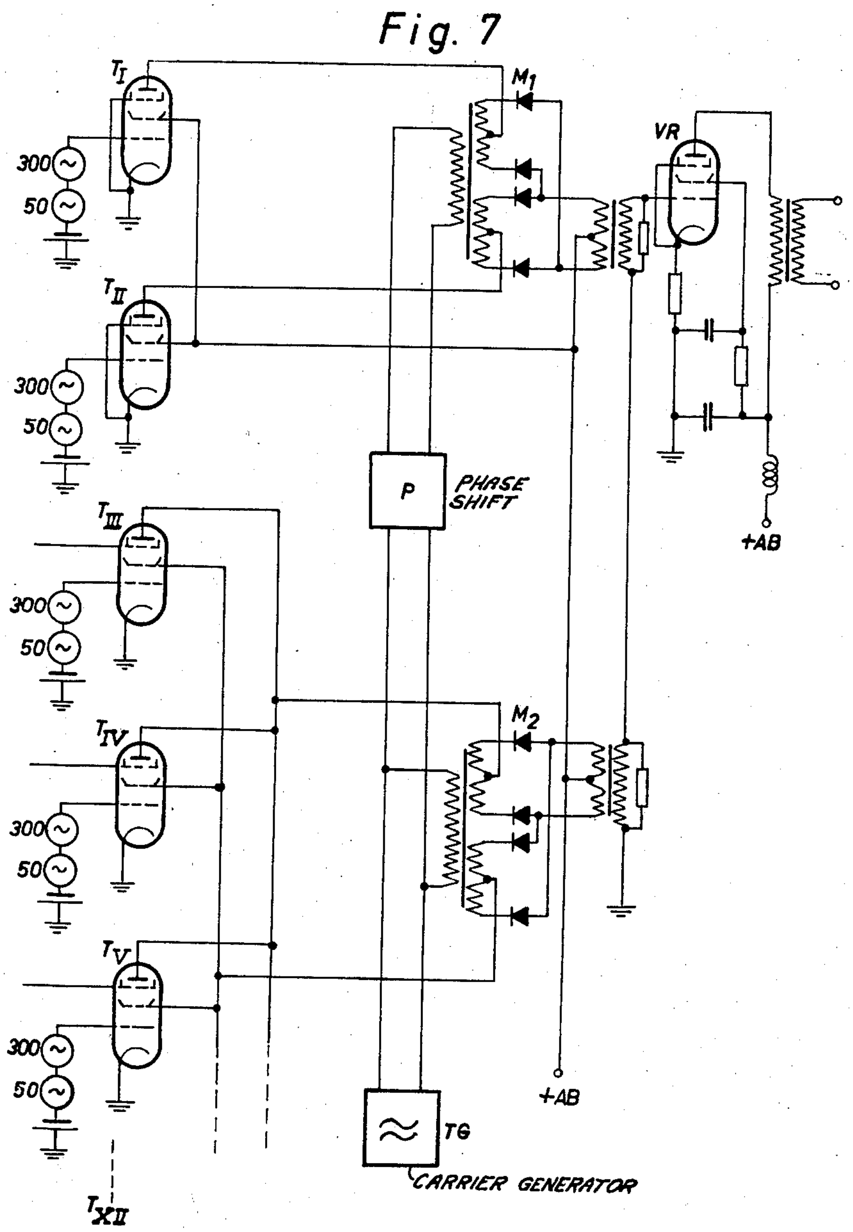
Fig. 7 is a circuit diagram showing the circuit of a transmitting apparatus embodying the present system.
Figure 8:
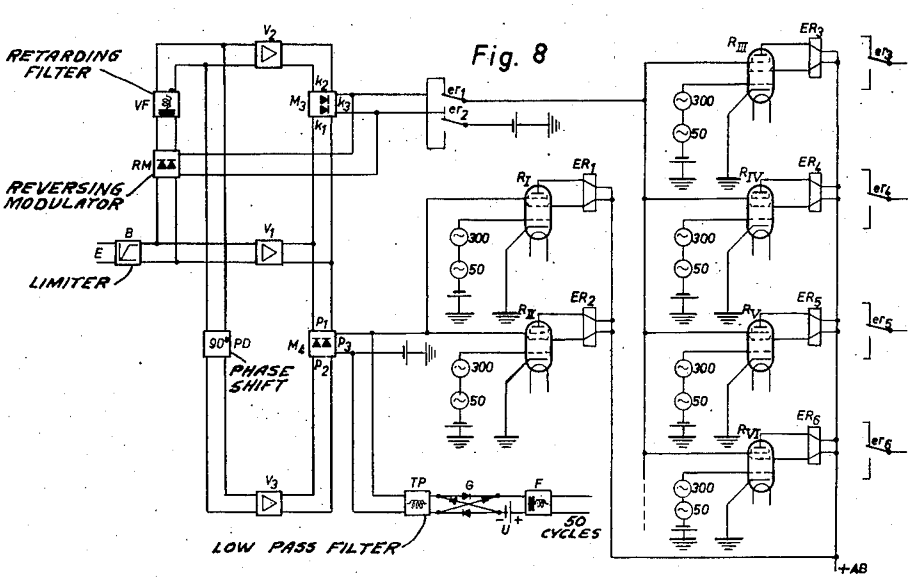
Fig. 8 is a circuit diagram showing the circuit for a receiving apparatus embodying the system of the present invention.

Figs. 7 and 8 show circuits for carrying out the present invention, using the 180° phase displacement system as the type of modulation. Transmission of the rhythm signals takes place over the first two stages of the twelve stage distributor system, the first step being given phase position +90°, and the second step having phase position −90°.

Fig. 7 illustrates the circuit of the transmitter. The transmitter distributor includes twelve scanning tubes, corresponding to the number of distributor stages. The scanning voltages above referred to, consisting of 50-cycle, 300-cycle and D.C. voltages, act upon the control grids of these tubes. Each tube passes anode or screen-grid current only during the scanning intervals allotted to them.

The modulation stage comprises the two modulators $M_1$ and $M_2$. Modulator $M_1$ serves to generate and modulate the rhythm pulses while modulator $M_2$ modulates the message signal pulses. The input of modulator $M_2$ has directly applied thereto the voltage of the carrier generator TG, while the input to modulator $M_1$ receives the carrier voltage, displaced in phase 90° by phase shift P. Each modulator includes two branches. When one of these is connected through for direct current, the input voltage is supplied to the grid of amplifier tube VR without phase shift. When the other branch is connected through, the same voltage, but with opposite polarity, acts upon the grid of this tube. Scanning tube $T_I$ of the first distributor step always supplies an anode current for the switching control of modulator $M_1$, which current produces an output voltage shifted by −90°. The anode current of tube $T_{II}$, on the other hand, results in an output voltage of opposite polarity to that of tube $T_I$, that is, a voltage shifted by +90°.

The messages to be transmitted or rather to say the voltages corresponding to the messages to be transmitted are connected to the suppressor grids of the further scanning tubes $T_{III}$ to $T_{XII}$ of which only $T_{III}$ to $T_V$ are shown. At the control grid of each of these tubes is an alternating voltage which is operable to make the tube pass current only during the corresponding scanning instant. This voltage, as has been explained with reference to Figs. 3*a* to 3*c*, is combined from a 50 cycle and a 300 cycle alternating voltage. These scanning voltages are indicated by the 50 cycle and 300 cycle generator symbols connected in the grid circuits of the respective tubes, the phase of the voltages for the tubes $T_{III}$ to $T_{XII}$ being shifted so that these tubes become conductive successively. As is apparent from Figs. 3*a* to 3*c*, the successive operation control of the tubes is obtained by corresponding phase shift of the 50 cycle alternating voltage and by reversal of the superimposed 300 cycle alternating voltage. The phase shift may for example be obtained by means of simple known filter elements with desired time delay. Other suitable means may of course be used for this purpose.

In the grid control circuit of each tube is also connected a current source which indicates that the corresponding grid is to be given a certain negative bias, the magnitude of such bias, which will depend on the type of the tube used, being such that the corresponding tube can become conductive only upon coincidence of the positive amplitudes of the 50 cycle and 300 cycle alternating voltage, as has likewise been explained with reference to Figs. 3*a* to 3*c*.

Assuming now that there is a message signal on the suppressor grid of a tube, at the instant when a scanning pulse becomes effective to make such tube conductive, predominantly anode current or screen grid current will flow during the scanning interval in the corresponding tube, depending respectively on the transmission of space- or mark-current; specifically, anode current will flow incident to space current because the suppressor grid is at a pass potential while screen grid current will flow incident to mark current because the suppressor grid is so negative that no electrons can reach the anode. A reversed operation is of course clearly possible by blocking the suppressor grid incident to space current so that screen grid current will flow and by freeing the suppressor grid incident to mark current so that electrons can reach the anode, thus permitting flow of anode current. Since all the anodes and all the screen grids of the scanning tubes $T_{III}$ to $T_{XII}$ are respectively connected in parallel with respective control branches of the modulator $M_2$, such modulator will become conductive either for the unaltered voltage (phase 0°) or for the reversed voltage (phase 180°), depending on which part of the modulator $M_2$ is affected. And since all these voltages occur successively, as already described, they will successively reach the grid of the amplifier VR and will accordingly appear amplified at the output of such tube, with a 300 cycle current superimposed upon a 50 cycle current and a stepping speed of 600 Bd. depending upon the scanning of the tubes $T_I$ to $T_{XII}$.

The output voltage may be in known manner transmitted to the transmission path over transmission filters together with the output voltages of further similar transmission arrangements.

Under certain circumstances, tubeless scanning circuits may be used in place of the scanning tubes $T_I$ to $T_{XII}$.

Fig. 8 illustrates the circuit at the receiving station. The voltage received is transmitted to the input E of the receiver circuit, if necessary after separation of the distributor paths of a plurality of systems operated over the same transmission path. The amplitude of the incoming voltage is first limited in limiting device B, whereby all level variations are eliminated and the enveloping curve of the signals is made approximately rectangular. This is followed by the demodulating device which operates substantially in accordance with well known principles based on the expedient of obtaining the synchronous auxiliary carrier frequency of constant reference phase position, required for demodulating phase-modulated signals, from the signal current itself, by reverse poling of the phase displacements contained within the rhythm of the scanning operation. The reverse poling is initiated by the signal current itself after demodulation into direct current.

The receiving system illustrated by way of example in Fig. 8 includes two demodulating devices. One of these, comprising modulator $M_3$, serves to demodulate the message signal pulses while the other, comprising modulator $M_4$, serves to demodulate the rhythm pulses.

As is well known, a double counter-phase modulator, for example a ring modulator, supplies a D.C. voltage at its output terminals whenever alternating voltages of equal frequency are fed to its two pairs of input terminals. The magnitude and direction of the resulting D.C. voltage are proportional to the cosine of the phase angle between the A.C. input voltages.

The signal voltage is amplified in amplifier $V_1$, and is applied directly to the terminals $k_1$ of modulator $M_3$; in addition, the signal voltage is transmitted over a polarity reverser (reversing modulator RM) to a filter having a relatively long initial operation period as compared to the distributor step duration (retarding filter VF), and thence, after amplification in amplifier $V_2$, to the second pair of terminals $k_2$ of the same modulator $M_3$. Depending upon the polarity which the polarity reverser RM happens to have at the moment it starts operating, the phase difference between the A.C. voltages at terminal pairs $k_1$ and $k_2$ of modulator $M_3$ will be approximately 0° or 180°. The direct current thereby produced at terminals $k_3$ of modulator $M_3$ is fed back into the reversing modulator RM to act as a control current; it maintains the polarity that happened to prevail at the start. The voltage at terminals $k_3$ of $M_3$ is also supplied to the receiving distributor over the polarity-reversing contacts $er_1$ and $er_2$, as will presently be described more in detail.

Any phase displacement of 180° occurring in the incoming signal voltage will be applied, practically without delay, to the terminals $k_1$ of modulator $M_3$ while the previous phase position still prevails at terminals $k_2$. This changes the phase differential between the voltages at $k_1$ and $k_2$ by 180° and thus also changes the direction of the direct current resulting at $k_3$. This direct current causes the reversing modulator RM to reverse the polarity of the alternating current being passed, and thus eliminates the phase displacement at practically the same moment. Any minor deviations in timing remain ineffective, because the delaying filter VF, having a very long initial operation period, is incapable of responding to momentary phase deviations. Thus we obtain at the output of VF an alternating voltage with uniformly progressing phase corresponding to the carrier frequency and free of sudden phase displacements. This alternating voltage serves as the demodulation carrier for receiving modulator $M_3$ after amplification in $V_2$.

Distributor steps 1 and 2, which deviate from the reference phase position by +90° and −90° respectively, cannot materially affect the relative stability of the phase position of the demodulation carrier derived from the signal voltage on the receiving side. During distributor steps 1 and 2, the D.C. voltage across terminals $k_3$ of $M_3$ becomes zero, as the voltages at $k_1$ and $k_2$ have a phase difference of ±90° during these brief moments.

The rhythm pulse steps 1 and 2 of the distributor are demodulated on the receiving side in a special modulator $M_4$ and are thus also separated from the message signal pulses. The demodulation carrier current of relatively stable phase position, prevailing at the output of filter VF, is displaced by 90° in the phase shift PD of modulator $M_4$. The terminals $p_1$ of the latter, however, receive the incoming signal voltage from amplifier $V_1$. Consequently, during rhythm pulse steps 1 and 2 of the transmitter distributor, there are phase angles of 0° and 180°, respectively, between the two pairs of input terminals $p_1$ and $p_2$, and a positive or negative D.C. voltage is accordingly produced at the output terminals $p_3$. During distributor steps 3 to 12, the phase angle between $p_1$ and $p_2$ is −90° or +90°, and the modulator $M_4$ will not supply any D.C. voltage at terminals $p_3$. The output voltage of $M_4$ is used to obtain the 50-cycle synchronization frequency required for controlling the receiving distributor. Also, the scanning frequency of 300 cycles can be obtained therefrom by frequency multiplication.

Distributor steps 1 and 2 will produce, at the output $p_3$ of modulator $M_4$, either first a negative and then a positive pulse or vice versa, depending upon the phase position of the demodulation carrier which, while relatively stable, is nevertheless subject to 180° shifts. Therefore, if the synchronization frequency were derived directly therefrom, its own phase position would be similarly uncertain. It is, therefore, advantageous to rectify the output voltage of modulator $M_4$ after thoroughly freeing it from the higher-frequency modulation products by means of a low-pass filter. In such rectification, it is also possible to introduce a threshold value, for example by connecting the rectifier G in series with a D.C. voltage U which makes the rectifier incapable of passing low voltages. This has the effect of suppressing small output voltages of modulator $M_4$, such as may arise due to phase errors in the demodulating system during distributor steps 3 to 12. After rectification, there results a double pulse of invariable polarity, containing the synchronization frequency of 50 cycles as the basic frequency of its rhythm. The output of filter F will then present the pure sine-shaped synchronization frequency. From this frequency, the twelve scanning voltages for the receiving side can be obtained by phase displacement and superimposition with 300 cycles and D.C. voltage, just as is done on the transmitting side.

The scanning voltages are conducted to the control grids of twelve distributor tubes in a similar manner as at the transmitter. At the suppressor grids of the distributor tubes $R_{III}$ to $R_{XII}$ (of which only the tubes $R_{III}$ to $R_{VI}$ are shown in Figure 8) there will be the received voltage supplied by the modulator $M_2$. In the anode and the screen grid circuit of these tubes are connected windings of receiver relays such as $ER_3$ to $ER_{XII}$ respectively associated with the corresponding signal channels. For example, if channel 3 is being scanned, whereby the receiver scanning time is preferably shorter than the scanning time at the transmitter, there will flow predominantly a current impulse over the anode or over the screen grid, depending on the polarization of the suppressor grid voltage at that instant, and such current will cause the associated receiver relay $ER_3$ to place its armature $e_3$ into a corresponding position thus producing in the local receiver circuit a current condition corresponding to the scanning at the transmitter. This condition is maintained by the bias force of the relay armature until such a time when one of the successively effective scanning operations causes the relay to place its armature into the alternate position. In the course of a distributor revolution, the tubes $R_{III}$ to $R_{XII}$ will successively become conductive each for an impulse, by the scanning voltages placed on their control grids. This takes place in the manner already described in connection with the tubes $T_{III}$ to $T_{XII}$ of Fig. 7. Each of the tubes $R_{III}$ to $R_{XII}$ is associated with a 50 cycle and a 300 cycle generator as well as with a direct current source. These elements are such that the individual tubes can become conductive only upon coincidence of the positive amplitudes of the 50 cycle and the 300 cycle alternating voltages. What has been said before with respect to Fig. 3 also applies to these tubes. Upon scanning of the individual tubes either the respective anode or the screen grid will become predominantly operative depending upon whether there is a space or mark current condition on the corresponding suppressor grid, and the associated receiver relay ER is operated accordingly.

As previously mentioned, the entire reception may be polarized wrong, for example, due to wrong setting of the reversing modulator upon first connection thereof or due to falsification of the phase of the demodulation carrier relative to the signal voltage, for example, on account of trouble in the transmission path, and a phase supervision and correction device is therefore necessary. The distributor steps 1 and 2 serve for the transmission of the synchronizing frequency and also contain the criterion for false or correct poling of the received signals in all remaining channels. To the suppressor grids of the receiver distribution tubes $R_I$ and $R_{II}$ is for this purpose connected the voltage supplied by the modulator $M_4$ and the contacts $er_1$ and $er_2$ of the respectively associated relays $ER_1$ and $ER_2$ operate as pole changers for the received voltage from the remaining channels 3 to 12.

During reception at one polarity, a pulse is transmitted, during the scanning time, first to $ER_1$ and then to $ER_2$. These pulses will flow in different directions in the two relays since the output voltage of $M_4$ has in the meantime changed its polarity; however, the pulses have the result that the contacts $er_1$ and $er_2$ remain in the positions illustrated. Reception in the remaining channels is then of the correct polarity. If the polarity of reception changes, for example due to a momentary disturbance, first $er_1$ and immediately thereafter $er_2$ will shift; reception in channels 3 to 12 will thus again be of the correct polarity. Contacts $er_1$ and $er_2$ will then remain in their position (opposite to that shown in Fig. 8) until another disturbance causes a further polarity error; this error will then be corrected without delay by restoration of the contacts $er_1$ and $er_2$ to their initial positions.

Figure 8A:
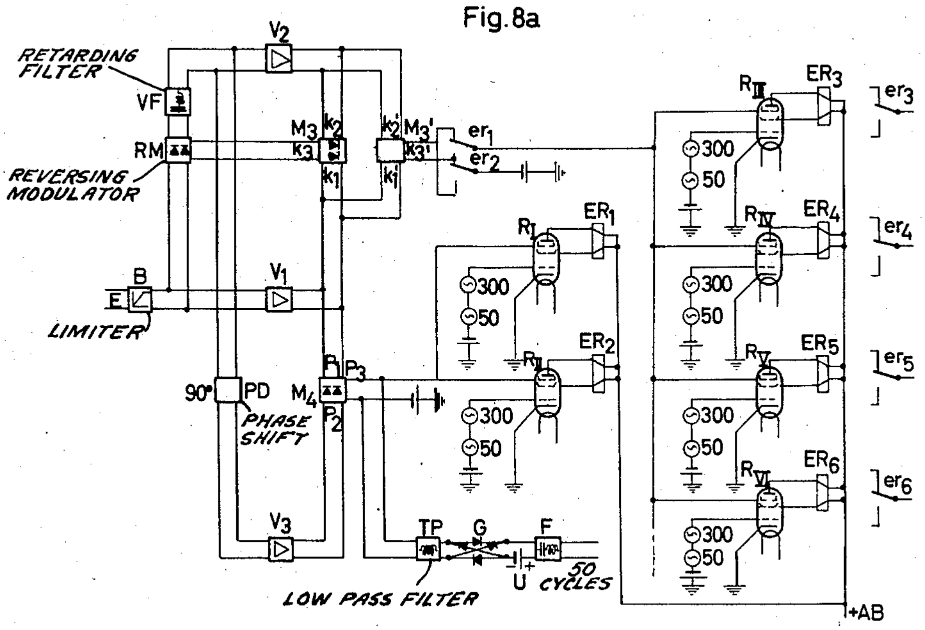
Figs. 8*a* and 8*b* show circuit modifications.
Figure 8B:
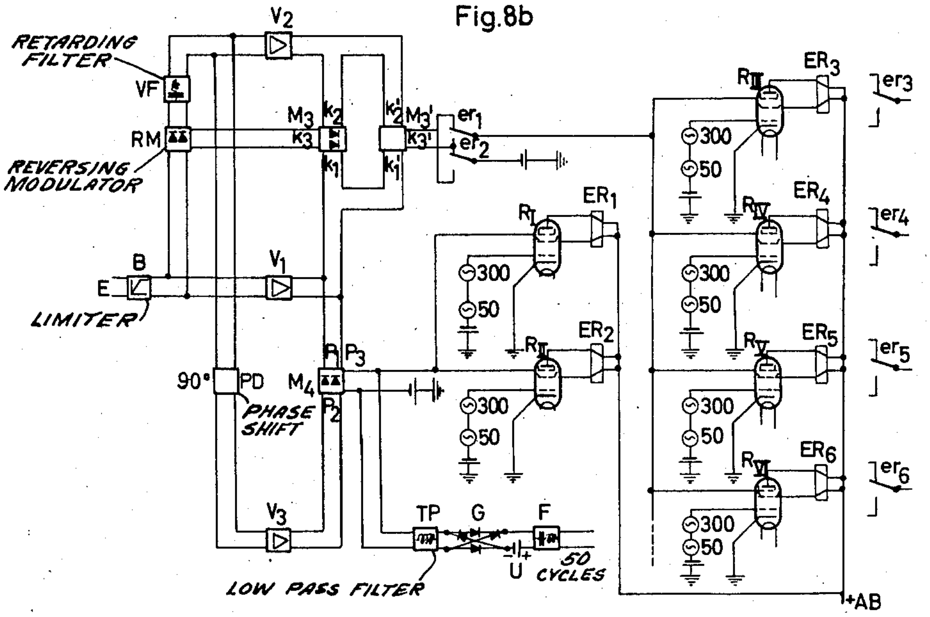

It is in many cases advantageous to substitute for the one modulator $M_3$ two modulators $M_3$ and $M_3'$ having their pairs of input terminals $k_1$, $k_1'$ and $k_2$, $k_2'$ connected in parallel as shown in Fig. 8*a* or in series to the outputs of amplifier $V_1$ and $V_2$, as shown in Fig. 8*b*. All parts outside the modulator $M_3$ are connected as in Fig. 8. The modulator $M_3$ has merely been subdivided so as to obtain two modulators $M_3$ and $M_3'$, the modulator $M_3$ feeding the reversing modulator RM and the output of $M_3'$ being connected to the suppressor grids of the tubes $R_{III}$ to $R_{XII}$ or being, as in Fig. 8*b*, in series with the outputs of the amplifiers $V_1$ and $V_2$, respectively. These two modulators are preferably so dimensioned that $M_3$ supplies the current for the reversing modulator RM at small voltages, while $M_3'$ must supply a high voltage with negligible current for controlling the suppressor grids of the receiving distributor tubes.

If only one distributor step is employed for transmitting the synchronization frequency and for phase control, it is even advantageous to replace modulator $M_3$ by three modulators: one for small output voltages for the reversing modulator, and two like ones for high output voltages, whose outputs are interconnected with opposite polarity in such a manner that a single reversing contact, operated by the phase controller, causes the signal distributor tubes to be connected at all times to that modulator output which then presents the correct polarity.

Changes may be made within the scope and spirit of the following claims.

I claim:

1. A time-multiplex pulse modulation system for transmitting a plurality of arhythmically occurring telegraph signals composed of elements of uniform duration, comprising a plurality of multiplex channels, a periodically operable multiplex distributor including output circuits connected to said channels respectively, means whereby said distributor has a working cycle corresponding in length to said uniform duration of the elements of the telegraph signals to be transmitted, means whereby each individual channel has an effective scanning interval exhibiting a length which is at least approximately equal to the length of the working cycle divided by the number of individual multiplex channels, phase coordinating means including voltage sources connected to said distributor rendering said output circuits successively and exclusively conductive for arranging the elements of the telegraph signals to be transmitted over each multiplex channel in a time pattern, with respect to the scanning intervals for the corresponding channel, which intervals are predetermined by said multiplex distributor, means whereby the arranging of said elements with respect to said intervals is such that element transitions in the telegraph signals to be transmitted over the corresponding channel take place between scanning intervals for that particular channel.

2. A time-multiplex pulse modulation system according to claim 1, comprising a phase coordinator providing partial patterns having screening steps which are so arranged, with respect to the scanning pulses, that the screening steps of one partial pattern fall midway of the scanning range of the scanning impulse ranges allotted to the other partial patterns.

References Cited in the file of this patent

UNITED STATES PATENTS

| | | |
|---|---|---|
| 2,048,081 | Riggs | July 21, 1936 |
| 2,213,941 | Peterson | Sept. 3, 1940 |
| 2,479,020 | Pelmulder | Aug. 16, 1949 |
| 2,513,910 | Bliss | July 4, 1950 |
| 2,744,960 | Greefkes et al. | May 8, 1956 |

FOREIGN PATENTS

| | | |
|---|---|---|
| 132,301 | Australia | Apr. 27, 1949 |